United States Patent  
Paxton

(10) Patent No.: US 8,021,519 B2  
(45) Date of Patent: Sep. 20, 2011

(54) WATER DISTILLATION SYSTEM

(75) Inventor: Gregory Mark Paxton, Victoria Point (AU)

(73) Assignee: Gregory Mark Paxton, Queensland (AU)

( * ) Notice: Subject to any disclaimer, the term of this patent is extended or adjusted under 35 U.S.C. 154(b) by 847 days.

(21) Appl. No.: 11/662,711

(22) PCT Filed: Sep. 14, 2005

(86) PCT No.: PCT/AU2005/001404
§ 371 (c)(1),
(2), (4) Date: Aug. 29, 2007

(87) PCT Pub. No.: WO2006/029464
PCT Pub. Date: Mar. 23, 2006

(65) Prior Publication Data
US 2008/0277261 A1 Nov. 13, 2008

(30) Foreign Application Priority Data
Sep. 14, 2004 (AU) .................. 2004905255

(51) Int. Cl.
*B01D 3/06* (2006.01)
*B01D 3/10* (2006.01)
*C02F 1/06* (2006.01)

(52) U.S. Cl. .......... 202/176; 159/2.1; 159/24.1; 159/46; 159/901; 159/DIG. 16; 202/205; 203/11; 203/23; 203/25; 203/88; 203/98; 203/DIG. 8

(58) Field of Classification Search ............ 159/2.1, 159/24.1, 26.1, 46, 901, DIG. 16; 202/176, 202/205; 203/1, 2, 10, 11, 23, 25, 27, 88, 203/94, 98, DIG. 4, DIG. 8
See application file for complete search history.

(56) References Cited

U.S. PATENT DOCUMENTS 2,389,789 A * 11/1945 Latham, Jr. ............... 203/2
3,288,685 A * 11/1966 Kemper et al. ............ 203/11
3,637,465 A * 1/1972 Wilson .................... 203/11
(Continued)

FOREIGN PATENT DOCUMENTS

DE 10260494 2/2004
(Continued)

OTHER PUBLICATIONS

Derwent Abstract Accession No. 87-337726/48, JP 2241592 A (Mitsubishi Heavy Ind KK) Oct. 22, 1987.

*Primary Examiner* — Virginia Manoharan
(74) *Attorney, Agent, or Firm* — Young & Thompson

(57) ABSTRACT

A system for distilling sea or brackish water includes a feed water arrangement for supplying feed water from a feed water source to one or more flashing stages. Each flashing stage has a water flash evaporator for vaporizing at least part of the water therein, and a condenser for receiving the vapour and converting at least a part of the vapour into distilled water. A heat storage arrangement provided with a heat generating source for storing heat energy is used to heat a fluid medium flowing through it. A heat exchange arrangement receives the hot fluid medium and transfers heat to a stream of vapour flowing under pressure from each flashing stage. The vapour leaving the heat exchange arrangement being at a raised temperature is arranged to be condensed into water at the condenser and to transfer some of its latent heat to the evaporator.

22 Claims, 1 Drawing Sheet

U.S. PATENT DOCUMENTS

| | | | | |
|---|---|---|---|---|
| 3,869,351 A | * | 3/1975 | Schwartzman | 202/172 |
| 4,136,276 A | * | 1/1979 | Ashe | 219/630 |
| 4,171,617 A | * | 10/1979 | Sakamoto et al. | 60/641.8 |
| 4,213,830 A | * | 7/1980 | Koppl | 203/11 |
| 4,267,022 A | * | 5/1981 | Pitcher | 203/11 |
| 4,412,529 A | * | 11/1983 | Johnston | 126/584 |
| 4,420,373 A | * | 12/1983 | Egosi | 202/173 |
| 5,582,690 A | * | 12/1996 | Weinberger et al. | 203/10 |
| 7,246,940 B2 | * | 7/2007 | Storm et al. | 374/136 |
| 2003/0089590 A1 | * | 5/2003 | Paxton et al. | 203/2 |
| 2005/0022981 A1 | * | 2/2005 | Helleur | 165/108 |
| 2006/0113179 A1 | | 6/2006 | Hausman | |

FOREIGN PATENT DOCUMENTS

| | | |
|---|---|---|
| WO | 02/032813 | 4/2002 |

* cited by examiner

WATER DISTILLATION SYSTEM

CROSS-REFERENCE TO RELATED APPLICATIONS

This Application is a national stage entry of PCT/AU2005/001404 filed on Sep. 14, 2005 claiming priority to Australian Provisional Patent Application No. 2004905255 filed on Sep. 14, 2004.

TECHNICAL FIELD OF THE INVENTION

THIS INVENTION relates to a water distillation system for recovering potable water from sea water or any organically or mineral polluted water source using a heat source from a heat generating apparatus such as a heat storage system.

BACKGROUND OF THE INVENTION

Methods for sea water de-salination have been proposed in a number of different technologies. Two major methods are described here as examples:
(a) Distillation Method
One form of this method involves raising the temperature of sea water at atmospheric pressure above 100° C. to produce steam. The steam is then distilled using either ambient air or water as the cooling medium to condense the steam back to pure water. This method has the following advantages:
1. Most bacteria are killed off as the water temperatures are above 65° C.;
2. Systems are easily monitored due to visible boiling taking place;
3. Principal of operation is easy to comprehend so little personnel training is needed;
4. Total Dissolved Solids (TDS) of <10 ppm are left in the distilled water. However this method also has a number of disadvantages including:
1. Very inefficient as indirect methods to heat the sea water are typically used;
2. At high temperatures any solids in the sea water will congeal. The congealed solids are deposited on the surface of the heat exchanger causing further reduction in efficiency.
Another form of this method of distilling sea water is to reduce the temperature of the boiling point of water by lowering the pressure in the distillation chamber. This method is favored on ships due to its lower energy consumption. The major drawback with this system is that the distillation temperature is too low to kill bacteria and ultra violet lamp generated ozone is usually needed to kill bacteria in the distilled water. It is also not suitable for large scale applications due to the difficulty of maintaining the distillation chamber at below atmospheric pressures.
(b) Reverse Osmosis
Reverse osmosis (R.O.) is a filtration system that uses a membrane to remove ionic, organic and suspended solids from a water supply. Unlike conventional filtration, a membrane system separates the feed water into two streams, a permeate stream and a concentrate stream. The permeate stream is the water that passes through the semi-permeable membrane, while the concentrate stream is the part of the feed stream that is used to flush the concentrated solids from the system.
A pump is used to feed water to membrane housings of the membrane system. The direction of the water flow is indicated by an arrow on individual housing. Water is separated by the membrane within the housing and leaves the membrane housing in two streams as permeate and concentrate.
The permeate is collected at the permeate manifold for systems where more than one membrane housing is used. One permeate line per membrane housing is useful. A pressure relief valve or a pressure switch is usually installed to protect the system against permeate stream over pressurization. The permeate then flows through a flow meter to the outlet point of the machine.
The concentrate leaves the last membrane housing and is split into two streams, the concentrate and the recycle, each with its own adjustable flow control valve. The concentrate valve has three functions namely: controlling the pressure within the machine, controlling the amount of concentrate flowing to the drain, and assisting in controlling the system recovery. A recycle valve channels a predetermined amount of concentrate into the pump inlet to achieve more turbulent cross flow.
The membrane will perform differently at varying pressures and will reject mono and polyvalent ions at a different rate or effectiveness.
This method relies very much on the efficiency of the pumps that drive the R.O. system and by their nature pumps are very inefficient users of energy.

OBJECT OF THE PRESENT INVENTION

An object of the present invention is to alleviate or to reduce to a certain level one or more of the above prior art disadvantages.

OUTLINE OF THE PRESENT INVENTION

In one form, although it need not be the only or indeed the broadest form, the invention resides in a system and process of using a heat generating source in a heat storage arrangement such as a heat storage vessel or heat storage vessels with steam pipe circuits to produce distilled potable water in large quantities at efficiencies approaching 70% of the gross calorific value of the energy delivered to the heat storage arrangement.

The system/process involves the utilization of the Carnot heat engine efficiency cycle as embodied in the second law of thermodynamics and also the utilization of the Rankine cycle in the efficient distillation and source water pre-heating during the process.

In one aspect therefore the present invention resides in a water distillation system comprising a feed water arrangement arranged to supply feed water from a feed water source to one or more flashing stages, the or each said flashing stage having a water flash evaporator arranged to vaporize at least a part of the feed water therein, and a condenser arranged to receive the vapor formed from the feed water in the evaporator and to convert at least a part of the vapor into water; a heat storage arrangement having a heat generating source arranged to store heat energy for heating a fluid medium flowing therethrough; a heat exchange arrangement arranged for the hot fluid medium and a stream of vapor from the or each said flashing stage to flow therethrough so that heat from the hot fluid medium is at least partly transferred to the stream of vapor; and the stream of vapor leaving the heat exchange arrangement being at a raised temperature being arranged to flow to said condenser to be at least partly converted by condensation into water and to transfer at least some of its latent heat to the evaporator.

The heat storage arrangement may include one or more vessels containing said heat generating source. The source may be selected from the group including graphite, lithium salt, vanadium, and the like.

The heat exchange arrangement may include an insulated duct provided with a number of finned carbon steel tubes arranged across the duct. The stream of hot fluid medium is arranged to flow into the duct and the vapor from the evaporator(s) is arranged to flow through the tubes.

In a preferred form the heat storage arrangement is arranged to supply a stream of hot fluid medium in the form of a gas to the heat exchange arrangement and the gas stream is arranged to transfer at least some of its latent energy to the vapor evolving from the flash evaporator(s).

In another preferred form the or each said one or more vessels is a heat sink with a regenerative heating path for the stream of hot fluid medium in the form of a water vapor. In this form the vessel or vessels may have a water pipe circuit.

It is also preferred that the heat exchange arrangement includes a first heat exchanger arranged downstream to said heat storage arrangement, and a second heat exchanger arranged downstream to said first heat exchanger to receive residual heat from the water from the condenser, and a pump and/or valve arranged to increase the feed pressure in the first heat exchanger in order to increase the extraction of sensible and latent heat from the first heat exchanger.

Where possible, the heat storage arrangement is configured to consume energy supplied from at least one external source and to store the consumed energy in the heat generating source. Preferably, said at least one external source is/are arranged to supply solar energy, and/or electric energy and/or heat energy. Advantageously, the heat storage arrangement is configured to consume energy supplied at predetermined time periods. Said time periods may correspond to off-peak periods set by relevant authorities. The energy may be locally produced, e.g. methane from mining operations or a pipeline gas such as ethylene or a liquid hydrocarbon, e.g. kerosene and/or off peak electrical energy. For some applications the gas may be hydrogen from electrolyzed water. The heat storage arrangement is there to enable the Carnot cycle to supply the requisite heat and the principles of that cycle apply. It is preferred that the system further includes a furnace or boiler or used jet engine arranged to complement the heat generating source as it has a heat output of the appropriate order and is economical to install. The heat generating source is arranged to absorb heat from a jet engine. The hot exhaust from the jet engine is directed through an insulated duct provided with a number of finned carbon steel tubes arranged across the duct. As the hot exhaust gas (>650° C.) passes through the heat exchange arrangement, heat is absorbed into the heat storage arrangement and feed water in the form of sea water or other source water in the brine circuit tubes is heated under pressure to a predetermined temperature above the predetermined boiling point of the feed water.

The heated water is then pumped through a pipe into the evaporator in the form of a flash distillation chamber. This flash distillation chamber is maintained at a vacuum pressure that allows the feed water to flash boil.

The second heat exchanger is used to preheat the feed water before the relatively high temperature first heat exchanger. To avoid the build up of mineral deposits in the heat exchanger tubes a magnetic induction pump may be used to reAcirculate the water at high velocities through the high temperature heat exchanger ensuring that the temperature rise of the water is no more than 2° C. at each pass of the water. This will ensure that there will be the minimum buildAup of solid lining in the heat exchanger water tubes.

Feed water is normally drawn into said one or each flashing stage by a pump that is controlled by a Digital Control System (DCS) using a Variable Frequency Drive (VFD) to dynamically control the temperature, flow and pressure of the process utilizing Proportional and Integral, Differential (P and ID) control. This allows the automation of the whole system without any intervention at all or with only little intervention, save for maintenance.

The incoming feed water can be directed into the preheat second heat exchanger before going through the high temperature first heat exchanger.

The incoming water may also be used to cool and condense the steam vapor coming from the evaporator or vacuum flash distillation chamber within the second heat exchanger whilst allowing a heat transfer to the incoming feed water.

The system will generate large amounts of heat and accordingly all high temperature areas may be insulated using Micropore™ insulation. The low temperature surface areas can be insulated with polystyrene foam and aluminum foil.

The expected output of potable water from this invention can be calculated as follows:

Taking a heat storage arrangement with a Kilowatt capacity of 620 Kw: Kw to joules (J)=Kw×3600000 joules Energy to raise steam by 10° C. and pressure by 45 Kpa=T2 (Steam output temperature and pressure)−T1 (Steam input temperature and pressure)=52920 Joules Therefore 620×3600000=2,232,000,000 Joules output of heat vessel.

Quantity of steam raised by 10° C.

1 Kg steam at 100 C×(Specific Heat Capacity of steam)× 10° C. and pressure by 45 Kpa (expected temperature and pressure difference between input steam and output steam)= 52920 Joules.

Therefore 2,232,000,000 divided by 52920=42,176 Kg distilled water in the first hour.

The energy cost per Kg of distilled water produced=cost of energy input to the heat vessel divided by the amount of water produced.

There is approximately 3,600,000 Joules per Kilowatt of energy and this is divided into the output of the heat storage vessel which is 2,232,000,000 Joules=620 Kilowatts of energy per hour. This is multiplied by $0.0262 c per Kilowatt hour and divided by 42,176 Kg of water produced=620× 0.0262 divided by 42,176=$0.000385 c per liter of water. This represents a 100% heat recovery situation, if we then apply a 50% heat recovery calculation the cost per liter becomes ($0.000385 divided by 100)×50=0.000770 c per liter.

BRIEF DESCRIPTION OF THE DRAWINGS

In order that the present invention can be more readily understood and be put into practical effect reference will now be made to the accompanying drawings which illustrate non-limiting embodiments of the present invention and wherein:—

DETAILED DESCRIPTION OF THE INVENTION

Figure 1:
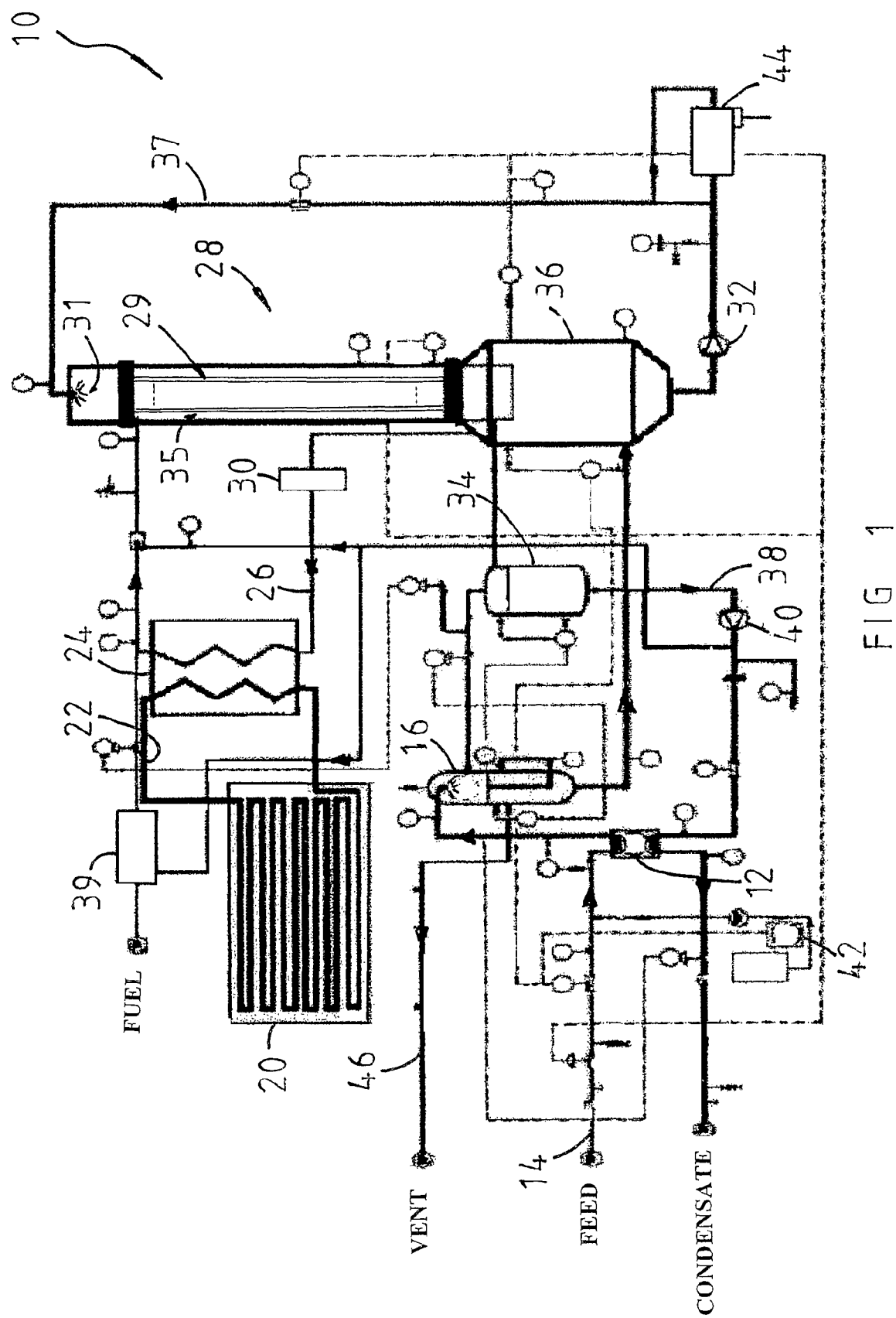
FIG. 1 is a schematic diagram of the system according to one embodiment of the present invention.

Referring to FIG. 1, the embodiment of the water distillation system 10 as shown has a secondary heat exchanger 12 arranged to receive feed water flowing in a feed water line 14 that is connected to a feed water source referred to as "FEED" such as a salt water tank. The feed water from the secondary heat exchanger 12 is conveyed to a deaerator 16 and ejected thereat as a spray. Undesired gases in the feed water are released to atmosphere through line 46 and "VENT". Deaerated water is then transferred to a reservoir 36 in a flashing stage 28. It should be noted that while one flashing stage 28 is described and shown for this embodiment, a plurality of flashing stages can be incorporated into the system 10 according to the present invention.

The system 10 also has a heat storage arrangement 20 which in this embodiment is in the form of an energy storage vessel and it uses off-peak electricity as energy source for charging energy storing media such as graphite in the storage vessel 20. It is understood that other energy sources such as solar energy, wind generated energy, and the like may be used to provide the energy source. Although, one vessel only is shown it is understood that the system 10 can have a plurality of such vessels. When such vessels are charged with off-peak electricity, they are useful as heat generators in large volume distillation processes namely of the order of 40-50 kl/hour. Vessel valves (not shown) are adjusted to control operation of the heat source to generate steam. Operating under steady conditions and using off peak electricity as fuel, a vessel temperature of 850° C. can be attained. Steam tubes 22 are connected between the vessel 20 and a primary heat exchanger 24 where the steam as a form of the hot fluid medium, exhausts into. At the heat exchanger 24, latent heat of vaporization transfers heat to steam tubes (not shown) contained in a steam pipe 26. These tubes in the steam pipe 26 are supplied with circulating feed vapor that is discharged from the flashing stage in the form of a flash evaporation vessel 28. A rotary valve 30 is provided to allow a pressure rise to occur in the feed vapor in the pipe 26 without changing the boiling point in an evaporator 29 in the flash evaporation vessel 28. In this embodiment, the vapor temperature rises to about 110° C. The evaporator 29 in this case is formed of a bundle of vertical tubes through which the feed water travels.

A recirculating pump 32 supplies a constant feed water that has been deaerated to the evaporator 29 as sprays 31. Sea water contains about 35 g/l solids. The solids remain in solution when warmed from ambient storage temperature as the feed water passes through the secondary heat exchanger 12 which has plate sections made of thin wall titanium. Solid materials in the feed water are removed by a solid removal arrangement 44 which traps solid materials but allowed the feed water to return to the evaporator 29.

The recirculating pump 32 increases the pressure of the feed water from the secondary exchanger 12 and the deaerator 16.

A variable frequency controller (not shown) is arranged to control the pump 32 and thereby controlling feed water flow. The evaporator 29 is maintained at atmospheric pressure by controlled rotation of the rotary valve 30. As the hot feed water is released into the evaporator 29 the water partly vaporizes, and the vapor travels to the heat exchanger 24 where it expands to a higher pressure and temperature. The water vapor at a raised temperature in the pipe 26 then flows to a condenser 35 which is cooled by the lower temperature feed water in the brine circuit 37 on its way to a condensate tank 34. Distilled water is conveyed through a condensate line 38 for discharging through heat exchanger 12 and to transfer a high percentage of its latent and sensible heat to the incoming feed water. A condensate pump 40 is arranged in the line 38 to increase flow of the condensate. In this case, the water vapor at a raised temperature enters the flash evaporation vessel 28 and a part of it would be in contact with the external surfaces of the bundle of the evaporator tubes 29 where the latent heat energy of the vapor is partly transferred through the tube walls to heat the feed water therein. The part of the vapor in contact with the external surfaces of the tubes would then be cooled and form a condensate in the form of distilled water.

A ventilation line 46 connects the aerator 16 to an outlet referred to as "VENT".

The heat vessel 20 and the heat exchangers 12 and 24 are enclosed in an insulated membrane. Valves are used to adjust the feed water flowing to the secondary heat exchanger 12 which serves to pre-heat the incoming feed water. A dosing pump 42 is incorporated in the feed line 14 to control flow pressure of the feed water therein.

A complimentary steam module 39 supplied with a fuel (FUEL) for heating the module 38 is arranged to compliment the vessel 20. The module 39 is also arranged to heat the condensate from the condensate tank 34 and provides the heated condensate to the flashing stage 28.

Whilst the above has been given by way of illustrative example of the present invention many variations and modifications thereto will be apparent to those skilled in the art without departing from the broad ambit and scope of the invention as herein set forth in the following claims.

The invention claimed is:

1. A water distillation system comprising:
   a feed water arrangement arranged to supply feed water from a feed water source;
   at least one flashing stage in fluid connection with said feed water arrangement to receive said feed water,
   said at least one flashing stage having i) a water flash evaporator arranged to vaporize at least a part of the feed water fed therein, and ii) a condenser arranged to receive vapor formed from the feed water in the evaporator and to convert at least a part of the vapor into water;
   a heat storage arrangement having a chargeable heat storage medium arranged to store heat energy derived from at least one external energy source and to release the stored heat energy for heating a fluid heat transfer medium flowing therethrough in a closed flow path; and
   a heat exchange arrangement having i) a primary heat exchanger provided with a first heat transfer section forming a part of the closed flow path of the fluid heat transfer medium, and ii) another heat transfer section arranged to receive a stream of vapor from said at least one flashing stage to flow therethrough, while in said another heat transfer section heat from the fluid heat transfer medium is at least partly transferred to the stream of vapor,
   wherein the stream of vapor leaving said another heat transfer section is at a raised temperature and is arranged to flow to said condenser to be at least partly converted by condensation into water and to transfer at least some of its heat to the evaporator, and the heat storage arrangement further comprises at least one vessel containing said heat storage medium and said heat storage medium is selected from the group consisting of graphite, lithium salt, and vanadium.

2. The system according to claim 1 further comprising air extraction means arranged to create a partial vacuum in the flash evaporator.

3. The system according to claim 1, wherein the or each said at least one vessel is a heat sink with a regenerative heating path forming a part of the closed flow path of the fluid heat transfer medium.

4. The system according to claim 3, wherein the fluid heat transfer medium is in the form of a water vapor, and said at least one vessel has a water pipe circuit through which the fluid heat transfer medium flows.

5. The system according to claim 1, wherein,
the heat exchange arrangement further comprises a secondary heat exchanger, and
at least one of said primary and secondary heat exchangers has an insulated duct provided with a number of finned carbon steel tubes arranged across the duct, the fluid heat transfer medium being arranged to flow into the duct and the vapor from the evaporator being arranged to flow through the tubes.

6. The system according to claim 1, wherein the primary heat exchanger is arranged downstream to said heat storage arrangement, and a secondary heat exchanger is arranged downstream to said primary heat exchanger to receive residual heat from the water flowing from the condenser for preheating said feed water.

7. The system according to claim 6, wherein a pump or valve is arranged to controllably increase the vapor pressure in the primary heat exchanger in order to increase the extraction of sensible and latent heat from the primary heat exchanger.

8. The system according to claim 1, further including circulation means arranged to circulate the feed water through said at least one flashing stage.

9. The system according to claim 8, wherein the circulation means has a controllable pump arranged to deliver said feed water into said at least one flashing stage at a set pressure or flow rate.

10. The system according to claim 9, wherein said controllable pump is arranged to re-circulate the feed water at a sufficiently high velocity to minimize the build up of mineral deposits in the evaporator.

11. The system according to claim 10, wherein said controllable pump is arranged to re-circulate said feed water at a velocity so that a rise of temperature of the feed water is no more than 2° C. at each pass through said at least one flashing stage.

12. The system according to claim 1, wherein said at least one external energy source is arranged to supply solar energy, electric energy, or heat energy for charging said heat storage medium.

13. The system according to claim 1, wherein the heat storage medium is configured to receive off-peak electric energy.

14. The system according to claim 1, further including a furnace, boiler, or jet engine arranged to complement said at least one external energy source by providing heat for absorption at the heat storage medium.

15. The system according to claim 14, wherein the heat storage medium is arranged to absorb heat transferred from another heat exchange arrangement through which hot exhaust from the jet engine is directed to flow.

16. The system according to claim 15, wherein said another heat exchange arrangement has an insulated duct provided with a number of finned carbon steel tubes arranged across the duct and the hot exhaust gas is arranged to flow through the duct and passes the finned tubes so that heat is absorbed into the heat storage arrangement.

17. A water distillation system comprising:
a feed water arrangement arranged to supply feed water from a feed water source;
at least one flashing stage in fluid connection with said feed water arrangement to receive said feed water,
said at least one flashing stage having i) a water flash evaporator arranged to vaporize at least a part of the feed water therein, and ii) a condenser arranged to receive vapor formed from the feed water in the evaporator and to convert at least a part of the vapor into water;
a heat storage arrangement having a chargeable heat storage medium arranged to store heat energy derived from at least one external energy source and to release stored energy for heating a fluid heat transfer medium flowing therethrough in a closed flow path; and
a heat exchange arrangement having i) a primary heat exchanger provided with a first heat transfer section forming a part of the closed flow path of the fluid heat transfer medium, and ii) another heat transfer section arranged to receive a stream of vapor from said at least one flashing stage to flow therethrough, while in said another heat transfer section heat from the fluid heat transfer medium is at least partly transferred to the stream of vapor,
wherein the stream of vapor leaving said another heat transfer section is at a raised temperature and is arranged to flow to said condenser to be at least partly converted by condensation into water and to transfer at least some of its heat to the evaporator, and wherein the primary heat exchanger is arranged downstream to said heat storage arrangement, and a second heat exchanger is arranged downstream to said primary heat exchanger to receive residual heat from the water flowing from the condenser for preheating said feed water, and a pump and/or valve is arranged to controllably increase the vapor pressure in the first heat exchanger in order to increase the extraction of sensible and latent heat from the first heat exchanger.

18. A water distillation system comprising:
a feed water arrangement arranged to supply feed water from a feed water source;
at least one flashing stage in fluid connection with said feed water arrangement to receive said feed water,
said at least one flashing stage having i) a water flash evaporator arranged to vaporize at least a part of the feed water therein, and ii) a condenser arranged to receive vapor formed from the feed water in the evaporator and to convert at least a part of the vapor into water;
a heat storage arrangement having a chargeable heat storage medium arranged to store heat energy derived from at least one external energy source and to release stored energy for heating a fluid heat transfer medium flowing therethrough in a closed flow path; and
a heat exchange arrangement having i) a primary heat exchanger provided with a first heat transfer section forming a part of the closed flow path of the fluid heat transfer medium, and ii) another heat transfer section arranged to receive a stream of vapor from said at least one flashing stage to flow therethrough, while in said another heat transfer section heat from the fluid heat transfer medium is at least partly transferred to the stream of vapor,
wherein the stream of vapor leaving said another heat transfer section is at a raised temperature and is arranged to flow to said condenser to be at least partly converted by condensation into water and to transfer at least some of its heat to the evaporator,
further including circulation means arranged to circulate the feed water through said at least one flashing stage, the circulation means having a controllable pump arranged to deliver said feed water into said at least one flashing stage at a set pressure or flow rate.

19. The system according to claim 18, wherein said controllable pump is arranged to re-circulate the feed water at a sufficiently high velocity to minimize the build up of mineral deposits in the evaporator.

20. The system according to claim 19, wherein said controllable pump is arranged to re-circulate said feed water at a velocity so that a rise of temperature of the feed water is no more than 20° C. at each pass through said at least one flashing stage.

21. A water distillation system comprising:
a feed water arrangement arranged to supply feed water from a feed water source;
at least one flashing stage in fluid connection with said feed water arrangement to receive said feed water,
said at least one flashing stage having i) a water flash evaporator arranged to vaporize at least a part of the feed water therein, and ii) a condenser arranged to receive vapor formed from the feed water in the evaporator and to convert at least a part of the vapor into water;
a heat storage arrangement having a chargeable heat storage medium arranged to store heat energy derived from at least one external energy source and to release stored energy for heating a fluid heat transfer medium flowing therethrough in a closed flow path; and
a heat exchange arrangement having i) a primary heat exchanger provided with a first heat transfer section forming a part of the closed flow path of the fluid heat transfer medium, and ii) another heat transfer section arranged to receive a stream of vapor from said at least one flashing stage to flow therethrough, while in said another heat transfer section heat from the fluid heat transfer medium is at least partly transferred to the stream of vapor,
wherein the stream of vapor leaving said another heat transfer section is at a raised temperature and is arranged to flow to said condenser to be at least partly converted by condensation into water and to transfer at least some of its heat to the evaporator,
further including a furnace, boiler or jet engine arranged to complement said at least one external energy source by providing heat for absorption at the heat storage medium, wherein the heat storage medium is arranged to absorb heat transferred from another heat exchange arrangement through which hot exhaust from the jet engine is directed to flow.

22. The system according to claim 21, wherein said another heat exchange arrangement having an insulated duct provided with a number of finned carbon steel tubes arranged across the duct and the hot exhaust gas is arranged to flow through the duct and passes the finned tubes so that heat is absorbed into the heat storage arrangement.

* * * * *